United States Patent [19]

Di Liddo

[11] 4,361,411
[45] Nov. 30, 1982

[54] STORAGE SYSTEM

[75] Inventor: Natale Di Liddo, Borgo San Dalmazza, Italy

[73] Assignee: Istituto Grafico Bertello S.p.A., Italy

[21] Appl. No.: 86,833

[22] Filed: Oct. 22, 1979

[30] Foreign Application Priority Data

Apr. 27, 1979 [IT] Italy ............................... 12569 A/79

[51] Int. Cl.³ ..................... B65G 1/10; B65G 65/00
[52] U.S. Cl. ................................. 414/277; 312/268;
312/134; 312/197; 414/280; 414/270; 414/331
[58] Field of Search ............... 414/235, 238, 239, 259,
414/277, 280, 286, 499, 270, 269, 661, 331;
198/726, 606, 725, 750; 312/268, 134, 91, 97, 97.1

[56] References Cited

U.S. PATENT DOCUMENTS

| 3,809,259 | 5/1974 | Pipes | 414/280 |
| 3,883,008 | 5/1975 | Castaldi | 414/270 |
| 4,240,540 | 12/1980 | Hobbs et al. | 198/726 |

FOREIGN PATENT DOCUMENTS 2743395 12/1978 Fed. Rep. of Germany ...... 414/277

*Primary Examiner*—John J. Love
*Assistant Examiner*—L. E. Williams
*Attorney, Agent, or Firm*—Jacobs & Jacobs

[57] ABSTRACT

A storage system is described in which bins are transferred from a first storage position to an inspection position through the operation of a pair of endless belts carrying bin engaging device whereby a bin is moved along bin guides by sequential engagement of the bin engaging device on either belt followed by the bin engaging device of the other belt.

4 Claims, 8 Drawing Figures

STORAGE SYSTEM

DETAILED DESCRIPTION

Storage systems in which drawers or bins, arranged in cabinets, are extracted for inspection (and/or removal of the contents such as forms, papers, tools, spare parts and the like) and then returned automatically are well known. Typical of these prior art devices are those described in U.S. Pat. Nos. 3,883,008 and 3,999,823.

Means for transferring a bin or drawer from one side of the cabinet to another for purposes of inspection or removal or addition of contents are known from German OLS No. 2,743,395 but such systems have the disadvantage that no idle time is provided to permit contemporaneous consultation with two bins on the same side.

Systems in which there is a high frequency of consultation or use have provided means for removal of the drawer from either side of the cabinet so that it is possible, for example, to remove a drawer or bin from the right side or from the left side and, in either case, to then return it to the cabinet. The bin or drawer is effected by a mechanical or magnetic hooking operation with the hooking means being moved by chains or endless screws. For movement in either direction however it is necessary to provide releasing means in the hooking mechanism in order to permit the bin or drawer to release to the opposite side. For example, the drawers or bins can be provided with a double moveable hook and two moveable belts. One of the hooks engages the drawer, advances it for a portion of the transfer saddle and then disengages itself by lowering, the bin then being advanced by a motorized belt. Before the drawer or bin has completely crossed the saddle, the double hook is lifted and engages the drawer for eventual return to its storage position.

Systems in use at present for the movement of a drawer or bin from a storage space to either side for consultation, inspection, additions or removals have a number of disadvantages and inconveniences. One of these involves the complexity of the mechanism necessary for the intermittent motion of the double hook and belts, discussed above. Moreover, difficulty is often encountered in aligning the drawer or bin on the center of the belt which is used for advancement on the transfer saddle. The fact that motion of the drawer is effected through two separate elements, a double hook and a belt, also increases the chances of damage to the entire installation if even only one of the two elements fails to perform its function.

The present invention pertains to a storage system in which bins are transferred from a storage position to one or more inspection positions through the use of two motorized belts or chains disposed in the same horizontal plane and parallel to one another along two legs of their respective tracks, which legs however are slightly displaced. Each of the belts or chains carries engaging means, operable to engage a storage bin at either end and to advance the bin along the leg of the belt's track which is parallel to a similar leg of the other belt.

It is thus an object of the present invention to provide a mechanism for the transferal of storage bins from storage positions to inspection positions. It is a further object to permit such transfer to either of two opposed inspection positions.

A further object of the present invention is to provide a mechanism which is simple and yet sturdy in construction and which precludes damage to the overall system through possible malfunction of any components.

These and other objects will be apparent to those skilled in the art from the following description and from the drawings in which, FIG. 1 is a top view of the saddle or transfer means of the present storage systems;

Figure 1:
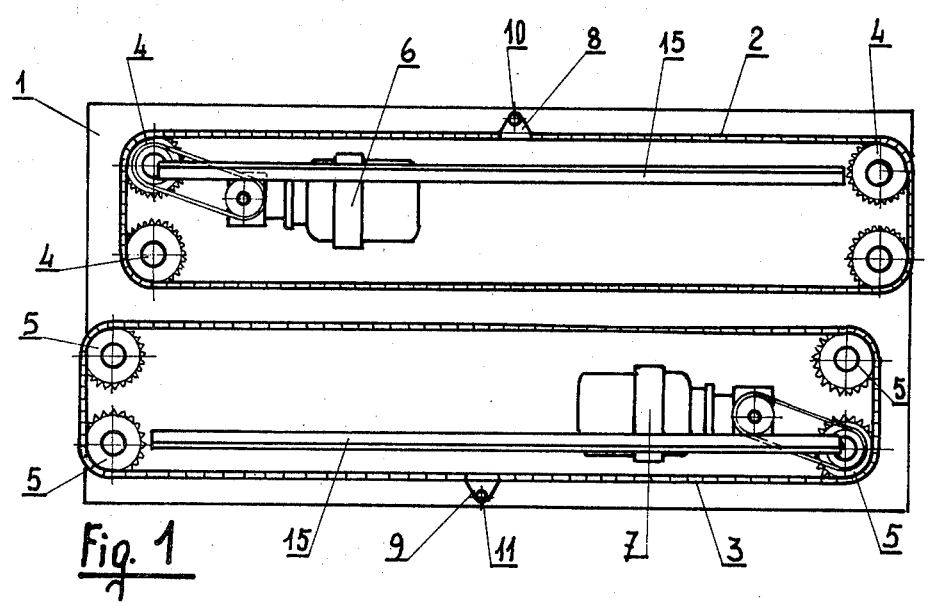

Referring now in greater detail to the drawings, there is shown in FIG. 1, a base 1 of the saddle or transfer means. This base is mounted on the well known mechanism (not shown) utilized for horizontal and vertical movement between the series of drawers or bins. Two endless belts or chains 2 and 3 are independently engagably mounted on sprockets 4 and 5, respectively. The term "belt" used herein is specifically intended to include any endless flexible device such as flexible toothed belts and link chains. The belt and sprocket mechanism of each of these two components are independently operated as for example by separately activated motors and/or separately engagable reduction gears 6 and 7, respectively, adapted for advancement, stopping and reversal of each belt independently of the other [although the composite of their action will be coordinated by conventional control means (not shown)].

Mounted on base 1 within the area defined by sprockets 4 and 5, and thus belts 2 and 3, is a pair of bin guides 15.

Groups of sprockets 4 and 5 are rotatably mounted on base 1 and define two polygonal tracks for belts 2 and 3. At least one leg of each of the polygonal tracks lay in parallel but offset relationship to a corresponding and proximate leg of the other polygonal track, which pair of parallel legs lies within and parallel to bin guides 15. While in the embodiment shown in the drawings the polygonal track is the preferred rectangle configuration, other trapezoidal configurations could of course be utilized.

Figure 2:
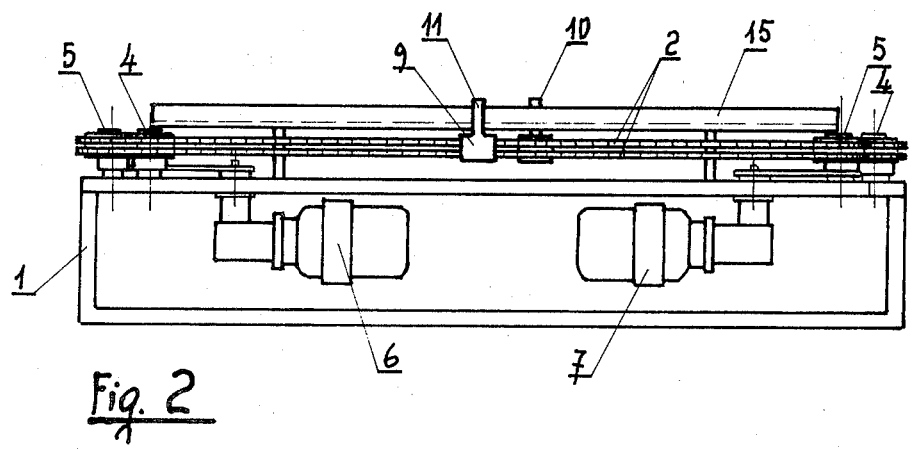
FIG. 2 is a side view of the saddle or transfer means shown in FIG. 1.

Disposed on each belt are bin engaging means including appropriate clamps 8 and 9 such as a U-bolt, and engaging pins 10 and 11. Belts 2 and 3 are preferably a double belt or chain (as shown in FIG. 2) in order to provide maximum vertical stability for engaging pins 10 and 11.

Figure 3:
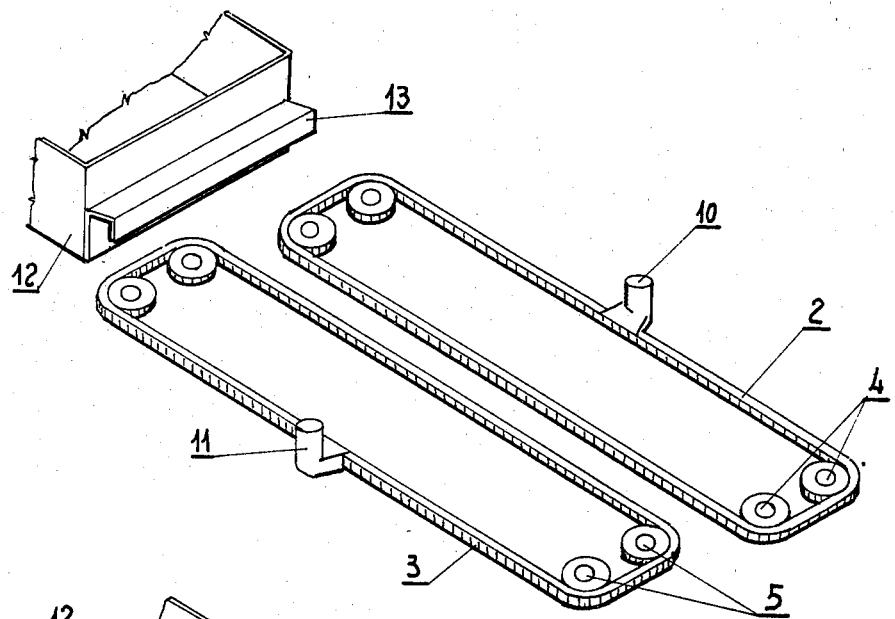
FIGS. 3, 4, 5, 6, 7 and 8 are perspective views of the sequential operation showing the engagement, transport and disengagement of a bin by said transfer means.
Figure 4:
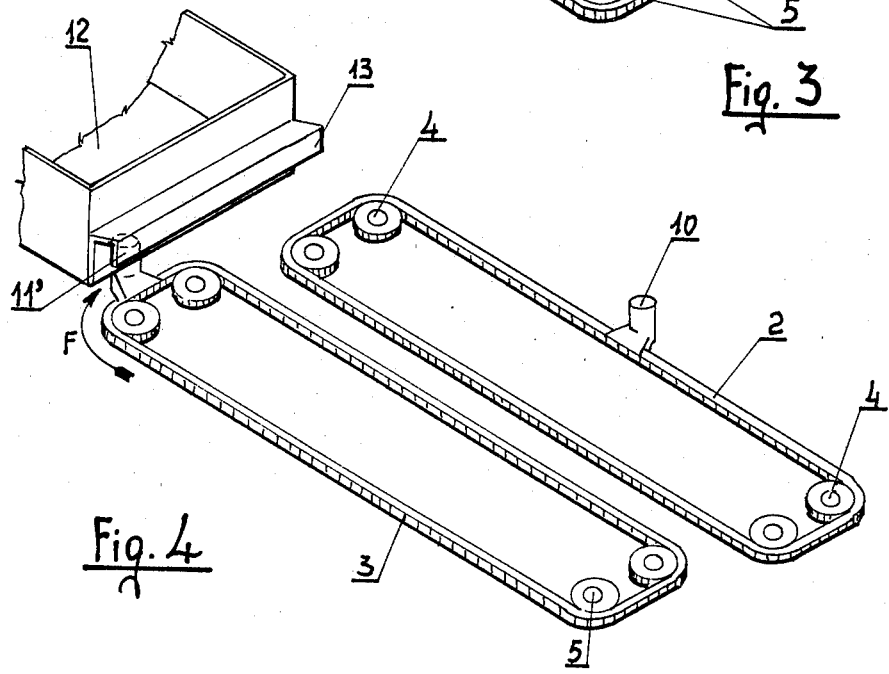
Figure 5:
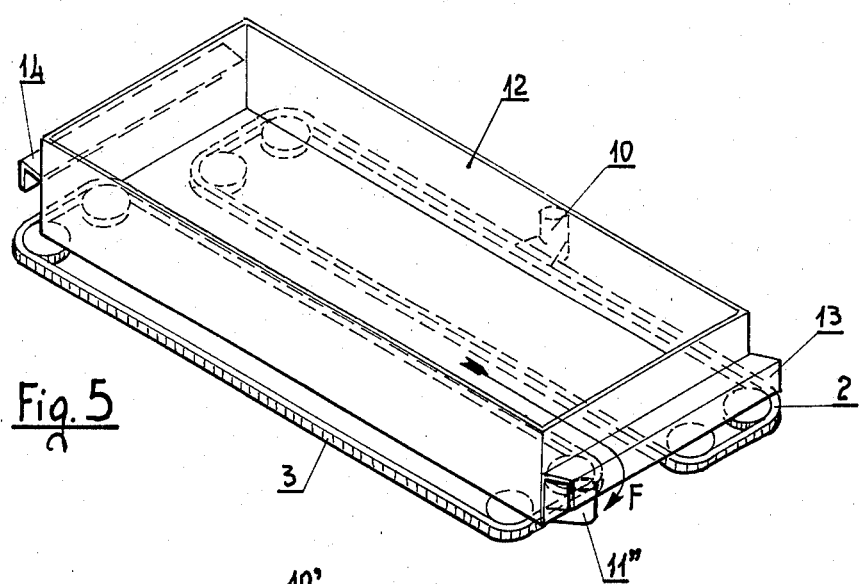
Figure 6:
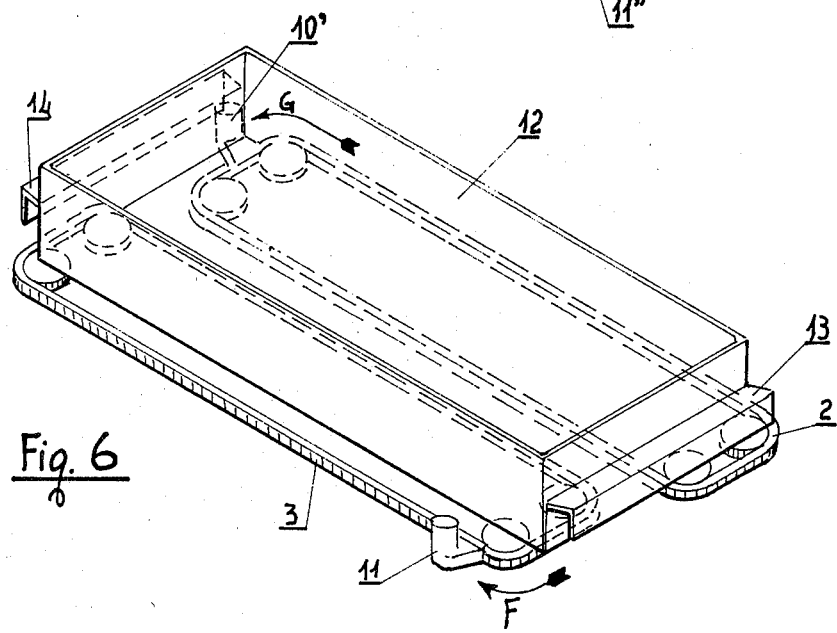

Pins 10 and 11 act sequentially but in concert in removing a bin from either of two opposing cabinets. For this purpose, the two parallel legs of the polygonal track of belts 2 and 3 are slightly offset from one another, as shown in FIGS. 1 and 2. As can be seen in FIGS. 5 and 6, bin 12 is equipped with engagable members 13 and 14 at opposing ends. As shown in FIGS. 3 and 4, initial advancement from the idle position (FIG. 3) in the direction shown by arrow F (FIG. 4) of bin engaging pin 11 permits engagement (shown at 11') of engagable member 13 on bin 12. Continued advancement of belt 3 and pin 11 causes removal of bin 13 (see FIG. 5). Disengagement of bin engaging pin 11 (shown at 11" in FIG. 5) then follows with simultaneous or subsequent engagement by the other bin engaging pin 10 on the engagable member 14 at the opposing end of bin 12 (shown at 10' in FIG. 6). Further advancement of belt 2 and its associated bin engaging pin 10 thus advances bin 12 over the transfer means (as shown at 10" in FIG. 7). During this time, bin engaging pin 11 returns to its idle position on a leg of the track distal the parallel long leg and outside the path defined by bin guide 15.

Reversal of the operation returns the bin to its first, storage position; i.e., initial engagement of engagable member 14 by engaging pin 10 moving in the reverse direction. The same movement would be used for permitting removal of a bin from an opposed storage area or rack. Thus bins can for example be removed from the left to the right (as shown in the drawings) or from the right to the left (not shown in the drawings) by simple positioning of the device from one side to the other.

Operation of the present storage system commences by the movement of base 1, and thus the entire mechanism, by conventional machinery to a position in front of the drawer which is to be transferred or transported from its storage position to an inspection position. This positioning and the selection of the appropriate bin is accomplished by conventional control mechanism and system. During this positioning, belts 2 and 3 are idling, as shown in FIGS. 1–3. Once in position, advancement means 7 are activated and belt 3 with its associated bin engaging pin 11 advances in the direction indicated by arrow F in FIG. 4. Engaging pin 11 then interacts with engagable member 13 which is preferably an inverted L-shaped lip having a horizontal portion and a vertical portion. The bin engaging pin passes under the horizontal portion of the lip and behind the vertical portion of engagable member 13. Continued operation of the advancing means 7 causes bin 12 to advance slightly until pin 11 is positioned in the center area of bin engagable member 13 whereupon it pivots and, proceeding up the parallel leg of the track, withdraws the bin and advances the same between bin guides 15. When bin 12 reaches the position shown in FIG. 5, continued advancement of belt 3 causes disengagement of bin engaging pin 11 and return to its idling position.

Figure 7:
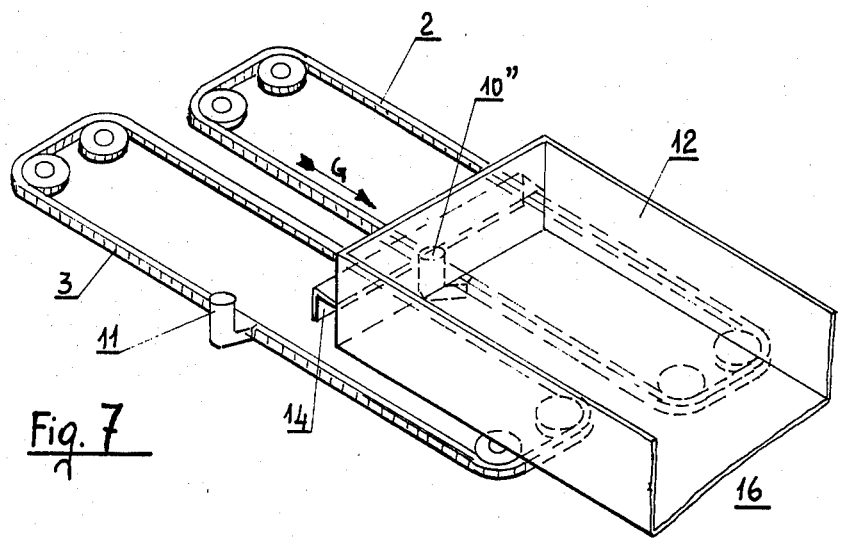
Figure 8:
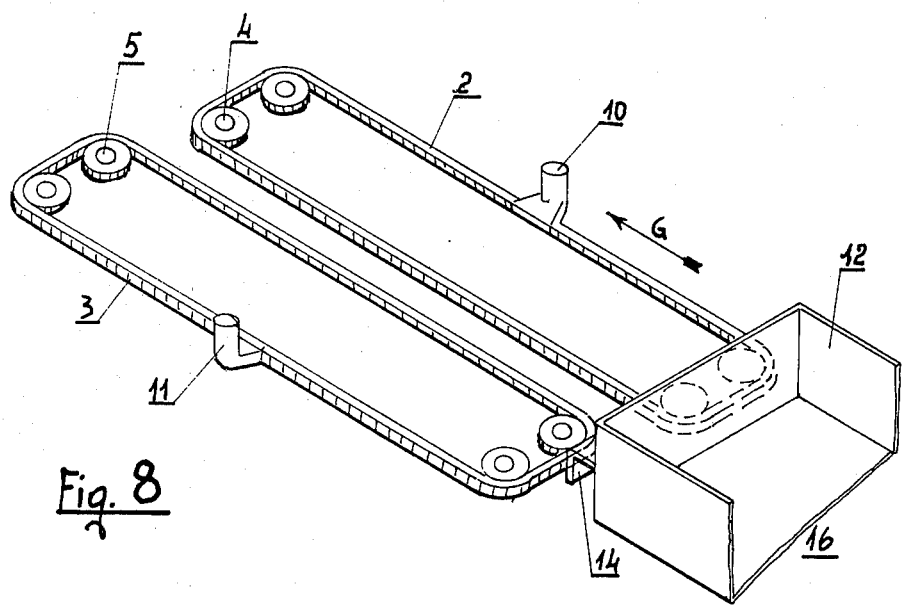

Activation of advancing means 6 (which activation may be automatic and preprogrammed) causes rotation of belt 2 and its associated bin engaging pin 10 in accordance with arrow G shown in FIGS. 6 and 7. Advancement of bin engaging pin 10 when engaged with engagable member 14 on the opposing end of bin 12 (as shown at 10") thus causes continued advancement of the bin to an inspection position, as shown for example in FIG. 8.

Exactly the inverse motions are performed by simple reversal of the motors or gears to return the bin or drawer to its initial storage position. If the initial storage position of the bin is to the left of the device, as shown in the drawings, belt 3 is initially activated and withdraws the bin from its storage position, during which time belt 2 is idle. If on the other hand, the bin is stored to the right of the device (not shown) belt 2 is initially activated and effects the extraction, during which time belt 3 is idle.

It can thus be seen that the entire transfer mechanism can be moved between two banks of bins, for extraction of bins from the right or the left and, with the bin engaging means in their idle position, raised or lowered for orientation with the bin to be extracted by a completely automatic program.

The invention has been described above in accordance with a typical and preferred embodiment and various construction modification or substitution of parts will be obvious to those skilled in the art.

What is claimed is:

1. A storage system comprising a plurality of like removable bins, each of said bins having an engageable member in the form of an open-ended inverted L-shaped lip at each of two opposed ends, and transfer means operable to selectively transport one of said bins from a first storage position to an inspection position and to selectively return said bin from said inspection position to said storage position, said transfer means including a base, a pair of parallel bin guides mounted on said base, two groups of sprockets rotatably mounted on said base, a pair of endless belts disposed in the same horizontal plane, each belt engaging one of said groups of sprockets, said groups of sprockets defining two polygonal tracks having two long legs for said belts about said bin guides, at least one long leg of each of said polygonal tracks being disposed in parallel but offset relationship to one long leg of the other polygonal track within and parallel to said bin guides; bin engaging means comprising a pin disposed on each of said belts and operable to pass under the horizontal portion of said lip and behind the vertical portion of said lip of one of said engageable members on said bin when said bin engaging means is advancing along a first non-parallel leg of said track, to advance said engaged bin along said parallel long leg of said track, to pass out of said lip when further advanced from said parallel long leg to a second non-parallel leg, and to move said disengaged bin engaging means to an idle position between said first and second non-parallel legs, and means operable to advance, stop and reverse each of said belts independently of the other of said belts, said bin being moved between said storage position to said inspection position by sequential engagement by the bin engaging means on a first of said belts an advancement thereby along said parallel long leg of said first belt and then by the bin engaging means on the second of said belts an advancement thereby to said inspection position along said parallel long leg of said second belt.

2. A storage system according to claim 1 wherein said groups of sprockets define like rectangular tracks, said bin engaging means either engaging or disengaging said bin engagable member when moving along the short legs of its rectangular track and advancing said engaged bin when moving along the long leg of its rectangular track which lies within said bin guides.

3. A storage system according to claim 2 wherein said means operable to advance, stop and reverse each of said belts are a pair of reversible motors, one of said motors driving one sprocket in one of said group and the other of said motors driving one sprocket in the other of said group.

4. A storage system according to claim 2 including means operable to return said bin engaging means to an idle position on the long leg of said track opposite said parallel long legs.

\* \* \* \* \*